United States Patent
Stuple et al.

(10) Patent No.: US 9,122,654 B2
(45) Date of Patent: *Sep. 1, 2015

(54) METHOD AND SYSTEM FOR DERIVING AND MATCHING LOCAL FORMATTING IN AN ELECTRONIC DOCUMENT

(75) Inventors: Stuart Stuple, Carnation, WA (US); Mark Yalovsky, Seattle, WA (US); Christopher Pratley, Seattle, WA (US); Owen C. Braun, Seattle, WA (US); Peter Loren Engrav, Seattle, WA (US); Peter Patrick Baer, Duvall, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 975 days.

This patent is subject to a terminal disclaimer.

(21) Appl. No.: 12/789,915

(22) Filed: May 28, 2010

(65) Prior Publication Data

US 2010/0241954 A1  Sep. 23, 2010

Related U.S. Application Data

(63) Continuation of application No. 10/668,664, filed on Sep. 23, 2003, now Pat. No. 7,757,165.

(51) Int. Cl.
*G06F 17/00* (2006.01)
*G06F 17/21* (2006.01)
*G06F 9/54* (2006.01)
*G06F 17/24* (2006.01)

(52) U.S. Cl.
CPC .............. *G06F 17/211* (2013.01); *G06F 9/543* (2013.01); *G06F 17/214* (2013.01); *G06F 17/24* (2013.01)

(58) Field of Classification Search
CPC ............................. G06F 17/24; G06F 17/211
USPC .................. 715/250, 255, 724, 235, 236, 256
See application file for complete search history.

(56) References Cited

U.S. PATENT DOCUMENTS

| | | | |
|---|---|---|---|
| 5,881,381 A | 3/1999 | Yamashita | |
| 5,940,800 A | 8/1999 | Bennett | |
| 6,570,582 B1 | 5/2003 | Sciammarella | |
| 6,877,138 B2 * | 4/2005 | Fitzpatrick et al. | 715/769 |
| 7,480,861 B2 * | 1/2009 | Yalovsky et al. | 715/255 |
| 2002/0091776 A1 | 7/2002 | Nolan | |
| 2002/0174135 A1 | 11/2002 | Pellegrin | |
| 2003/0007013 A1 | 1/2003 | Gatis | |
| 2003/0056179 A1 | 3/2003 | Mori | |
| 2003/0182388 A1 * | 9/2003 | Alexander et al. | 709/213 |
| 2004/0243574 A1 | 12/2004 | Giroux | |
| 2005/0149871 A1 | 7/2005 | Broman | |
| 2005/0188307 A1 | 8/2005 | Bailey | |
| 2005/0251774 A1 | 11/2005 | Shah | |

\* cited by examiner

*Primary Examiner* — Stephen Hong
*Assistant Examiner* — Matthew Ludwig
(74) *Attorney, Agent, or Firm* — Jessica Meyers; Danielle Johnston-Holmes; Micky Minhas

(57) ABSTRACT

Determining and applying format attributes associated with content in an electronic document that is cut or copied from an electronic document and pasted into the same or different electronic document. The determination may be based on the format attributes of the content within a region of an electronic document containing the cut or copied content and the format attributes of a region of content that includes the location where the cut or copied text may be pasted. Local formatting may be associated with the source region of content and the destination region of content. Direct, or emphasis formatting, may be associated with content that has been cut or copied.

20 Claims, 13 Drawing Sheets

*Fig. 8a*

This is a first region of text. The font face is Arial, the font size is 18 point, and the font color is _black_. The word "black" in the previous sentence has the additional formatting attributes of italic and bold.

*This is a second region of text. The font face is <u>Times New Roman</u>, the font size is <u>18 point</u>, the characters are italicized, and the font color is <u>black</u>. The words "Times New Roman," "24 point," and "black" in the previous sentence have the additional formatting attribute of underline, while the word "italicized" is not italicized.*

*Fig. 8b*

This is a second region of text. The font face is *Times New Roman*, the font size is *18 point*, the characters are italicized, and the font color is *black*. | The words *"Times New Roman," "24 point," and "black"* in the previous sentence have the additional formatting attribute of *underline*, while the word *"italicized"* is not italicized.

This is a first region of text. The font face is Arial, the font size is 18 point, and the font color is *black*. The word "black" in the previous sentence has the additional formatting attributes of *italic* and bold.

This is a first region of text. The font face is Arial, the font size is 18 point, and the font color is black. The word "black" in the previous sentence has the additional formatting attributes of italic and bold.

810

1000

*This is a second region of text. The font face is <u>Times New Roman</u>, the font size is <u>18 point</u>, the characters are italicized, and the font color is <u>black</u>. The font face is Arial, the font size is 18 point, and the font color is* black*. The words "Times New Roman," "24 point," and "black" in the previous sentence have the additional formatting attribute of underline, while the word "italicized" is not italicized.*

- This is a first outline object. (A1)
- Outline objects may be characterized by having a variety of levels. This level may be called Level A. (A2)
  - This level may be called Level B. (B1)
    - This level may be called Level C. (C1)
    - The parenthetical designation indicate a typical level designation. (C2)
  - This outline object has a font face of Arial. (B2)
  - This outline object also has a font size of 14, and a font color of black. (B3)
- This is the last item in the first outline object. (A3)

- This is a second outline object. (A'1)
- This level may be called Level A'. The "prime" symbol is used to distinguish the levels from the first outline object. (A'2)
  - This level may be called Level B'. (B'1)
  - This outline object has a font face of Arial. (B'2)
  - This outline object also has a font size of 14, and a font color of black. (B'3)
    - This level may be called Level C'. (C'1)
    - Level C' has a font color that is primarily grey. (C'2)
- This is the last item in the second outline object. (A'3)

- This is a second outline object. (A'1)
- This level may be called Level A'. The "prime" symbol is used to distinguish the levels from the first outline object. (A'2)
  - This level may be called Level B'. (B'1)
  - This outline object has a font face of Arial. (B'2)
  - This outline object also has a font size of 14, and a font color of black. (B'3)
    - This level may be called Level C'. (C'1)
    - Level C' has a font color that is primarily grey. (C'2)
- This is the last item in the second outline object. (A'3)

1170

1180

1220

- This is a first outline object. (A1)
- Outline objects may be characterized by having a variety of levels. This level may be called Level A. (A2)
  - This level may be called Level B. (B1)
    - This level may be called Level C. (C1)
    - The parenthetical designation indicate a typical level designation. (C2)
  - This outline object has a font face of Arial. (B2)
  - This outline object also has a font size of 14, and a font color of black. (B3)
- This is the last item in the first outline object. (A3)

- This is a second outline object. (A'1)
- This level may be called Level A'. The "prime" symbol is used to distinguish the levels from the first outline object. (A'2)  ⟵ 1170
  - This level may be called Level B'. (B'1)
  - This outline object has a font face of Arial. (B'2)
  - This outline object also has a font size of 14, and a font color of black. (B'3)
    - This level may be called Level C'. (C'1)  ⟵ 1180
    - Level C' has a font color that is primarily grey. (C'2)
    - font face of Arial. (B2)  ⟵ 1320
- This is the last item in the second outline object. (A'3)

1300

- This is a first outline object. (A1)
- Outline objects may be characterized by having a variety of levels. This level may be called Level A. (A2)
  - This level may be called Level B. (B1)  ⟵ 1110
    - This level may be called Level C. (C1)  ⟵ 1310
    - The parenthetical designation indicate a typical level designation. (C2)
  - This outline object has a font face of Arial. (B2)
  - This outline object also has a font size of 14, and a font color of black. (B2)
- This is the last item in the first outline object. (A3)

METHOD AND SYSTEM FOR DERIVING AND MATCHING LOCAL FORMATTING IN AN ELECTRONIC DOCUMENT

This application is a continuation of U.S. patent application Ser. No. 10/668,664, filed on Sep. 23, 2003, and titled METHOD AND SYSTEM FOR DERIVING AND MATCHING LOCAL FORMATTING IN AN ELECTRONIC DOCUMENT, the entirety of which is incorporated herein by reference.

TECHNICAL FIELD

The present invention relates to deriving and matching local formatting in an electronic document and specifically to evaluating electronic document formatting attributes and applying formatting attributes of a region of text in an electronic document to a selection of text characters that is placed into the region of text.

BACKGROUND

Electronic document editors are widely used in homes and businesses today. Familiar examples of these editors include word processing applications that operate on personal computers (PCs) and note-taking applications that operate on personal data assistants (PDAs). These applications strive to replace paper as the simplest means to record and communicate information. Computer technology provides these applications with advantages over paper, including the capability to vary the format of characters in a document.

A typical electronic document editor may contain a number of styles that define the format of content in an electronic document. For example, a style may define the font size, font face, font color, line spacing, and indentation of text characters entered in a location of the electronic document. The style may also include other formats, such as whether the characters should be presented in a bold font face, italic font face, underlined, or be struck through.

A user may be able to define a localized style. In this case, characters affected by this localized style may exhibit the characteristics of a specific style contained in the electronic editor in combination with some additional attribute or attributes. For example, a style contained in the electronic document editor may define the attributes of document content as font size 12 point, font face Times New Roman, color black, and single line spacing. At a specific location, a user may define a different or additional attribute, such as a text color other than black or a bold font face. A typical electronic document editor may define these localized attributes as a new style. An electronic document may contain many different styles, reflecting a combination of general and localized formatting. As such, tracking all of these styles increases the overhead of the electronic document editor computer application, which reduces the processing efficiency of the electronic document editor. Also, a user may emphasize one or more characters by applying a direct format, also referred to herein as an emphasis format. In this case, a user might use a specific formatting to make these one or more characters stand out, such as bold, italics, underlining, or a color different from the color of surrounding characters.

One strength of an electronic document editor is the capability to move or copy content from one part of the electronic document to another part or to another electronic document. However, cutting or copying content from one point in the document and pasting it at another point poses a problem in managing the many different styles in the electronic document. An issue is what formatting attributes should the pasted content have.

Certain electronic document editors currently available allow a user to choose whether the content cut or copied from a source location and pasted at a destination location should retain the formatting the content had at the source location or take on the formatting attributes at the destination location. The source location attributes are those attributes of the cut or copied text, without consideration of the formatting attributes of the text near the cut or copied text. The destination location formatting attributes are typically those attributes for the text characters after the insertion point, which marks the location where the cut or copied content is to be pasted.

This typical approach provides a very limited evaluation of the format attributes at the content source and destination locations. One reason for this limited evaluation is that computer processor limitations made a more extensive evaluation of format attributes in an electronic document undesirable. This extensive evaluation would cause a significant delay between the time a user initiates a paste operation and the time the operation is completed. However, with the increase in computer processor performance, this limitation in no longer an issue.

What is needed is a method for determining the format attributes at a region of an electronic document from which content has been cut or copied and the format attributes at a region of an electronic document to which the cut or copied content will be pasted and applying format attributes as determined by the method to the pasted content, along with any direct formatting characteristics.

SUMMARY

The present invention provides a computer-implemented method for determining the format attributes at a region of an electronic document from which content has been cut or copied and the format attributes at a region of an electronic document to which the cut or copied content will be pasted and applying format attributes as determined by the method to the pasted content.

In one aspect of the present invention, a computer-implemented method for determining and applying format attributes to content in an electronic document is disclosed. This method includes determining a set of format attributes associated with a region of content in the electronic document where a portion of that region is selected. The method also determines a set of format attributes associated with a second region of content in the electronic document, where this second region includes a destination for the selected content from the first region. The method also compares the first set of format attributes with the second set of format attributes and applies to the selected content those format attributes of the second set that differ from the attributes of the first set in response to placing the selected content at a location in the second region of content.

In another aspect, a system for determining and applying one or more format attributes to content in an electronic document is provided. This system includes a copy module operable to place a portion of content at a destination for the portion of content in the electronic document and a format module, operable to determine and apply format attributes associated with regions of content within the electronic document, where these regions may include a source location where the portion of content is cut or copied and a destination location where the portion of content is pasted. Before applying the formatting attributes to the content, the format module may compare the format attributes such that the format module applies format attributes of the destination region that differ from the format attributes of the source region.

In yet another aspect, a computer-implemented method for determining one or more format attributes for content of an electronic document is provided. This method includes determining each of the format attributes associated with a region of content of the electronic document, where this region includes selected content to be cut or copies. The method also includes determining if any of the portion of content to be cut or copied contains direct formatting attributes; and recording the format attributes and the direct formatting attributes associated with the portion of content.

In yet another aspect, a computer-implemented method for applying direct format attributes to content of an electronic document is provided. The method includes determining a set of format attributes associated with a region of content that includes a portion of content to be copied. The method also includes determining a set of format attributes associated with a region of content that includes a location into which the portion of content is to be pasted. The method determines if any of the portion of content contains direct formatting attributes and applies direct formatting attributes to the portion of content in response to pasting the portion of content at the location.

In yet another aspect, a computer-implemented method for determining and applying one or more format attributes to content cut or copied from one document and placed into a second document is provided. The method includes determining a set of format attributes associated with a region of content that contains a portion of content to be cut or copies from one electronic document and determining a second set of format attributes associated with a second region of content for a second electronic document, where the second region of content contains a destination for the portion of content. The method compares the first set of format attributes with the second set of format attributes and applies to the portion of content those format attributes of the second set of format attributes that differ from the first set of format attributes in response to placing the portion of content at the location of the second electronic document.

The aspects of the present invention may be more clearly understood and appreciated from a review of the following detailed description of the disclosed embodiments and by reference to the drawings and claims.

BRIEF DESCRIPTION OF THE DRAWINGS

FIG. 8a is a display image depicting two regions of text such as a source region and a destination region in accordance with an exemplary embodiment of the present invention.

FIG. 8b is a display image depicting text selected to be copied from a source region in accordance with an exemplary embodiment of the present invention.

FIG. 8c is a display image depicting text pasted into a destination region in accordance with an exemplary embodiment of the present invention.

FIG. 9a is a display image depicting two regions of text within outline objects such as a source region and a destination region in accordance with an exemplary embodiment of the present invention.

FIG. 9b is a display image depicting text selected to be copied from a source region of an outline object in accordance with an exemplary embodiment of the present invention.

FIG. 9c is a display image depicting text pasted into a destination region of an outline object in accordance with an exemplary embodiment of the present invention.

DETAILED DESCRIPTION OF THE EXEMPLARY EMBODIMENTS

Exemplary embodiments of the present invention support a computer-implemented method for determining the format attributes at a region of an electronic document from which content has been cut or copied and the format attributes at a region of an electronic document to which the cut or copied content will be pasted and applying format attributes as determined by the method.

Figure 1:
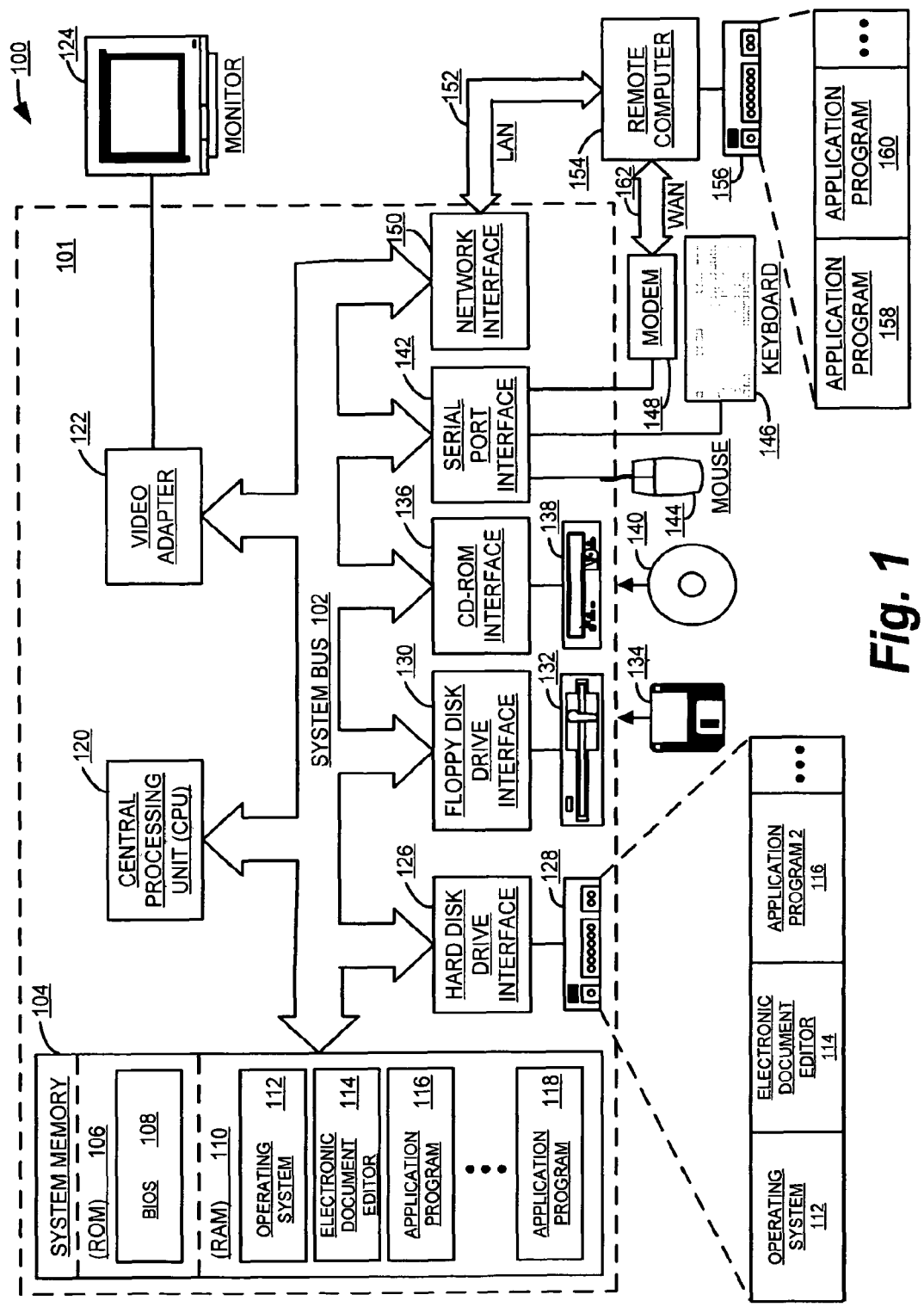
FIG. 1 is a block diagram illustrating a representative operating environment for an exemplary embodiment of the present invention.

FIG. 1 illustrates a representative operating environment 100 for an exemplary embodiment of the present invention. This representative operating environment includes a general-purpose computing device in the form of a conventional personal computer 101. Generally, the personal computer 101 includes a processing unit 120, a system memory 104, and a system bus 102 that couples system components including the system memory 104 to the processing unit 120. The system bus 102 may be any of several types of bus structures including a memory bus or memory controller, a peripheral bus, and a local bus using any bus architecture. The system memory includes a read-only memory (ROM) 106 and a random access memory (RAM) 110. A basic input/output system (BIOS) 108, containing the basic routines that help to transfer information between elements within personal computer 101, such as during start-up, is stored in ROM 106.

Personal computer 101 further includes a hard disk drive 128, a floppy disk drive 132 for reading from or writing to a removable magnetic disk 134, and an optical disk drive 138 for reading from or writing to a removable optical disk 140 such as a CD-ROM or other optical media. Hard disk drive 128, magnetic disk drive 132, and optical disk drive 138 are connected to system bus 102 by a hard disk drive interface 120, a floppy disk drive interface 130, and a CD-ROM disk drive interface 136, respectively. Although the exemplary environment described herein employs hard disk 128, removable magnetic disk 134, and removable optical disk 140, it should be appreciated by those skilled in the art that other types of computer readable media that can store data that is accessible by a computer, such as magnetic cassettes, flash memory cards, digital video disks, Bernoulli cartridges, RAMs, ROMs, and the like, may also be used in the exemplary operating environment. The drives and their associated computer-readable media provide nonvolatile storage of computer-executable instructions, data structures, program modules, and other data for personal computer 101.

A number of program modules may be stored on hard disk 128, magnetic disk 134, optical disk 140, ROM 106, or RAM 110, including an operating system 112, an electronic document editor 114, and multiple application programs 116-118. A representative embodiment of a document editor is disclosed in more detail below in connection with FIG. 2. Program modules typically include routines, sub-routines, programs, objects, components, data structures, etc., that perform particular tasks or implement particular abstract data types.

A user may enter commands and information into personal computer 101 through input devices, such as a keyboard 146 and a pointing device, such as mouse 144. Pointing devices may also include a trackball (not shown) and an electronic pen or stylus (not shown) that can be used in conjunction with an electronic tablet or a typical display screen. Other input devices (all not shown) may include a microphone, joystick, game pad, satellite dish, scanner, or the like. These and other input devices are often connected to processing unit 120 through a serial port interface 142 that is coupled to the system bus 102, but may be connected by other interfaces, such as a parallel port, game port, a universal serial bus (USB), or the like. A display device, such as monitor 124, may also be connected to system bus 102 via an interface, such as a video adapter 122. The monitor 124 may display images generated by an application program, such as an electronic document editor 114, and comprise a GUI by which a user can input information to the application program and the application program can communicate information to a user. In addition to the monitor 124, personal computers typically include other peripheral output devices (not shown), such as speakers and printers.

The personal computer 101 may operate in a networked environment using logical connections to one or more remote computers 154. Remote computer 154 may be another personal computer, a server, a client, a router, a network PC, a peer device, or other common network node. While a remote computer 154 typically includes many or all of the elements described above relative to the personal computer 101, only a memory storage device 156 has been illustrated in FIG. 1. The memory storage device 156 may include application program 158 and application program 160. The logical connections depicted in FIG. 1 include a local area network (LAN) 152 and a wide area network (WAN) 162. Such networking environments are commonplace in offices, enterprise-wide computer networks, intranets, and the Internet.

When used in a LAN networking environment, the personal computer 101 is often connected to the local area network 152 through a network interface or adapter 150. When used in a WAN networking environment, the personal computer 101 typically includes a modem 148 or other means for establishing communications over WAN 162, such as the Internet. Modem 148, which may be internal or external, is connected to system bus 102 via serial port interface 142. It will be appreciated that the network connections shown are exemplary and other means of establishing a communications link between the computers may be used.

Moreover, those skilled in the art will appreciate that the present invention may be implemented in other computer system configurations, including PDAs, electronic writing tablets, multiprocessor systems, microprocessor-based or programmable consumer electronics, network person computers, minicomputers, mainframe computers, and the like. The invention may also be practiced in distributed computing environments, where tasks are performed by remote processing devices that are linked through a communications network. In a distributed computing environment, program modules may be located in both local and remote memory storage devices.

Figure 2:
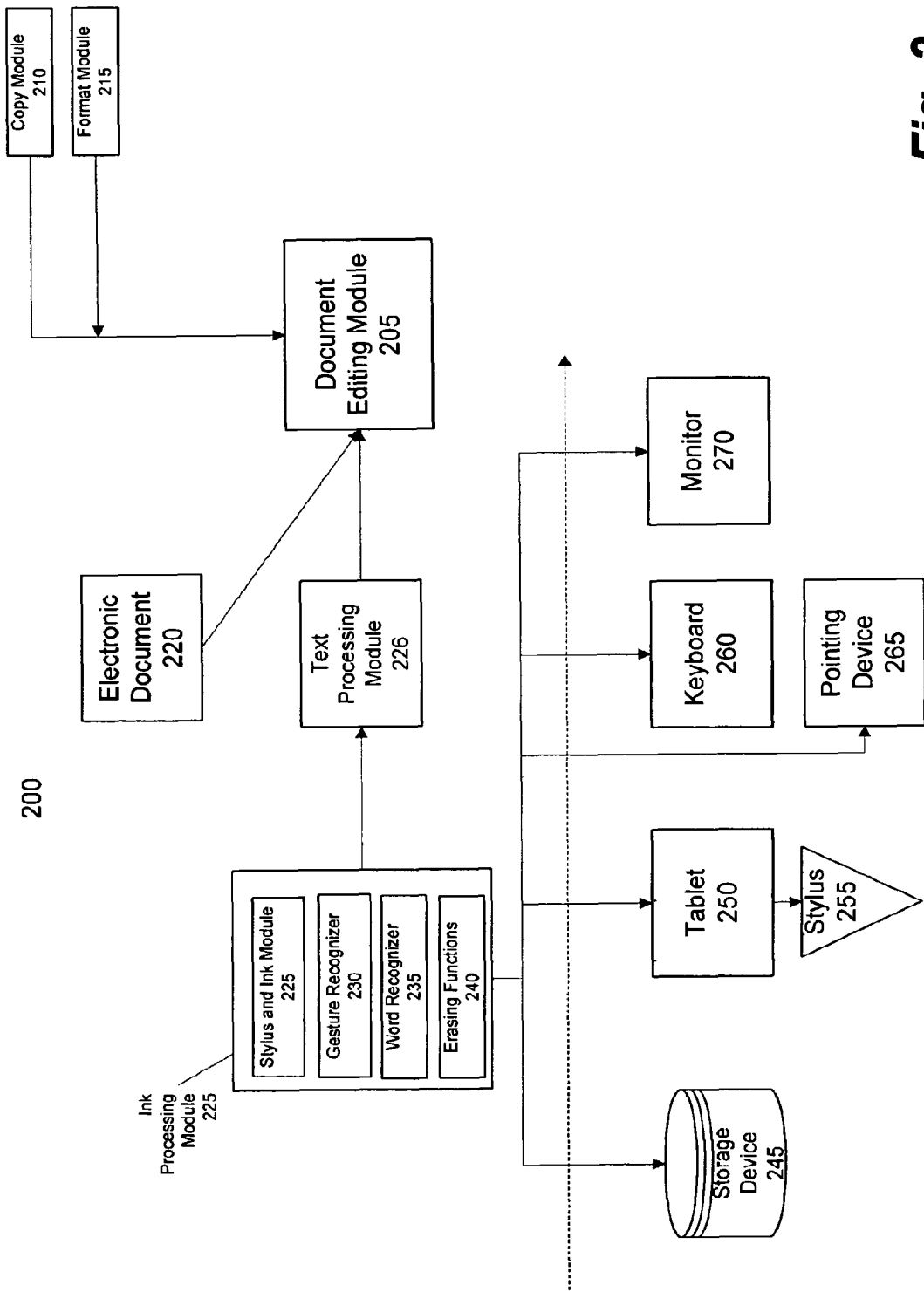
FIG. 2 is a block diagram depicting the primary functional components of an exemplary electronic document editor and related input devices.

FIG. 2 is a block diagram depicting the primary functional components of an exemplary electronic document editor and related input devices for the representative operating environment of an electronic writing tablet, otherwise described as an electronic tablet. Specifically, FIG. 2 depicts an architecture 200 for an electronic writing tablet in the context of an electronic document editor constructed in accordance with an exemplary embodiment of the present invention. Conventional input devices are represented by the keyboard 260 and the pointing device 265 (e.g., mouse, trackball). Other output devices (not shown) can include a printer or speaker. Other hardware components shown in FIG. 2 include an electronic tablet 250 and an accompanying stylus 255. The tablet 250 and stylus 255 are used to input handwriting strokes that can be converted to data, referred to as electronic ink. The electronic ink may be incorporated into an electronic document 220 and may be displayed on either the electronic tablet 250, the monitor 270, or both. Although the electronic tablet 250 and the monitor 270 are illustrated as being distinct, in an exemplary embodiment of the present invention, they can be integrated into a single component. The joint tablet/monitor component has the ability to display information and receive input from the stylus 255. In other words, the joint tablet/monitor component has the ability to provide a GUI for interacting with the document editing module 205.

In the representative architecture 200, an ink-processing module 225 is operable to receive data from the electronic tablet 250 and to render that data as electronic ink. In one embodiment of the present invention, the ink-processing module 225 can be a collection of software modules that perform different tasks for rendering handwriting strokes as electronic ink. For example, the stylus and ink module 228 can receive data describing the positions and angles of the stylus for a series of handwriting strokes. The stylus and ink module 228 can interpret the data for rendering electronic ink. Other software modules, such as a gesture recognizer 230 and word recognizer 235 can be designed to identify certain handwriting strokes and assign them a particular significance. For example, certain gestures such as a cross-out may be recognized and associated with other editing processes. The ink-processing module 225 can also include an erasing functions module 240 for removing electronic ink that has been previously rendered.

Although ink processing modules are known in the art and necessary for an electronic tablet to function, a novel document editing module has been developed by Microsoft Corporation of Redmond, Wash. that capitalizes on the benefits of handwriting processing technology. The module (i.e., document editor) is a free-form document editor that leverages the functionality of electronic handwriting technology to enable more effective and efficient note taking. Specifically, document editing module 205 facilitates manipulating electronic ink so that a user can create and modify an electronic document 220 with greater ease and sophistication. The document editing module 205 typically comprises a collection of software modules for controlling and manipulating electronic ink rendered on the monitor 270.

The exemplary electronic document editor also includes a copy module 210 and a format module 215. The exemplary copy module 210 performs operations associated with cutting or copying of content from one location in an electronic document, a source location, and pasting the content into a destination location, representing a location in an electronic document where the user wants to move of add the cut or copied content. In response to a user selecting content at a source location, such as with a pointing device 265, stylus 255, or keyboard 260, and initiating a cut or copy operation, such as by actuating a control on a toolbar or selecting an item in a menu, the copy module 210 will either remove the selected content from the source location, in the case of a cut operation, or copy the selected content, in the case of a copy operation. As such, although the module is termed here a "copy" module, this module will also perform operations associated with cutting textual content and pasting content at a specific location. Then, in response to a user initiating a paste command, such as by actuating a control on a toolbar or selecting an item in a menu, the copy module 210 will add the cut or copied content at a destination location, indicated by the location of an insertion point within an electronic document. This insertion point may be in a different electronic document. In other words, the content may be cut or copied from one electronic document and pasted into another electronic document. These different electronic documents may both be generated by a word processing type application or another type of computer application that includes text content, such as a spreadsheet or presentation program.

The exemplary format module 215 provides the formatting attributes for the content of an electronic document 220. For example, when content is entered into an electronic document, the format module 215 assigns format to the content. This format may be based on a predetermined default set of format attributes. This default set of attributes may be determined by a user or by a electronic document editor 114 (FIG. 1). Alternatively, a user may select a format attribute to apply to a specific set of content.

Similarly, the format module 215 may apply formatting to one or more selected characters in response to a user initiating a format command, such as by selecting a button on a toolbar or selecting an option in a menu. For example, a user may select one or more characters representing a word and initiate a command to make the formatting characteristics of that word include bolding.

When content is cut or copied from an electronic document and pasted into another section of the electronic document or a different electronic document, the format module 215 may assign formatting attributes to the content, perhaps based on the formatting at the source or destination locations.

Exemplary embodiments of the present invention relate most directly to formatting cut or copied text when pasted in an electronic document 220. FIGS. 1 and 2 provide a general overview of the environments in which the inventors contemplate exemplary embodiments of the present invention will be used. However, one skilled in the art will recognize that the present invention may operate on any computer system that could support an electronic document editor 114 (FIG. 1).

Figure 3:
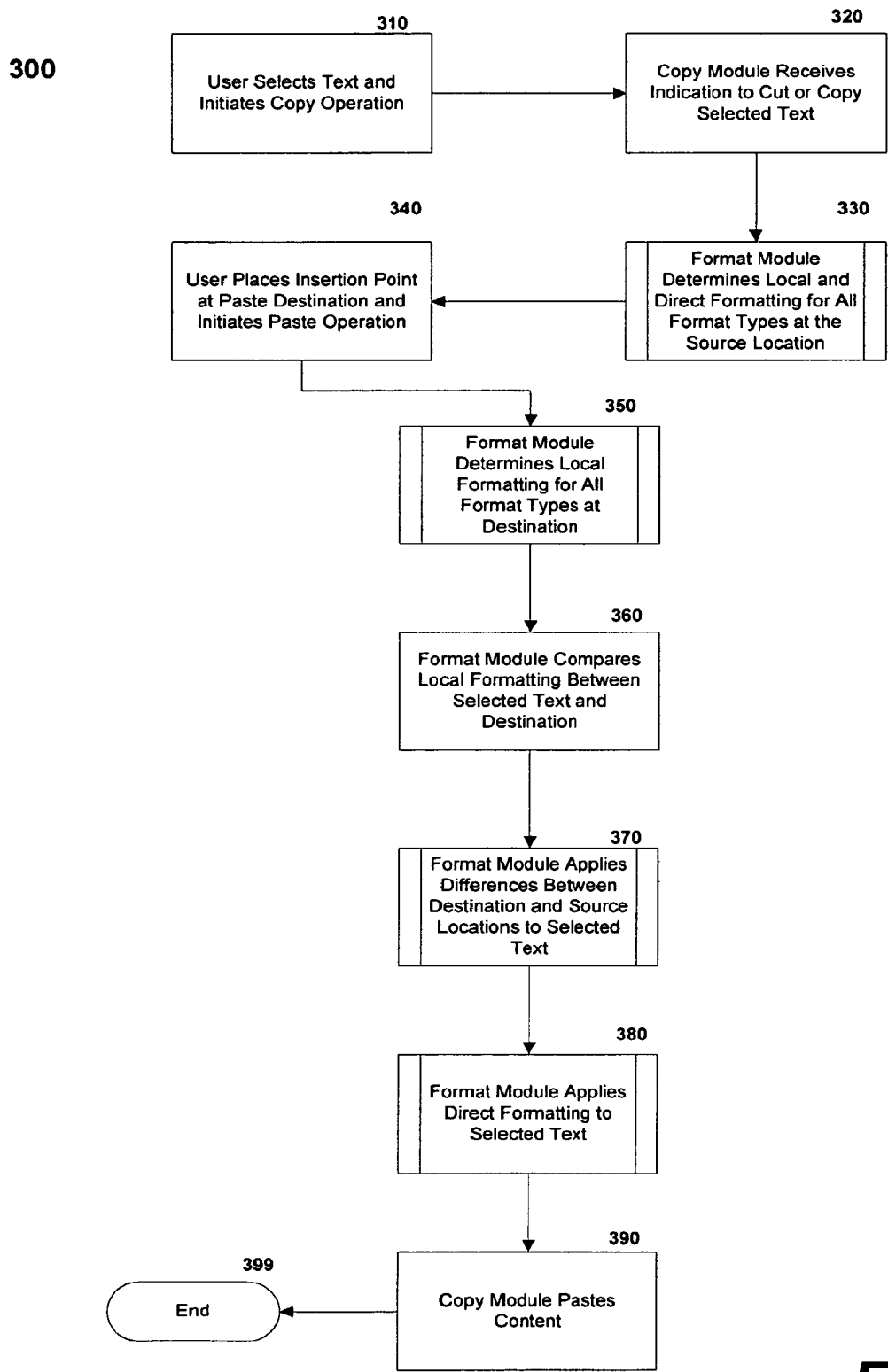
FIG. 3 is a flow diagram presenting a process for evaluating and applying format attributes associated with an electronic document in accordance with an exemplary embodiment of the present invention.

FIG. 3 is a flow diagram presenting a process 300 for evaluating and applying format attributes associated with an electronic document 220 in accordance with an exemplary embodiment of the present invention. Two types of formatting are evaluated and applied. Local formatting corresponds to the general formatting attributes of the content of the electronic document 220 at either a source location, that is, the location of the selected and cut or copied content, or a destination location, that is, a location where the cut or copied content is pasted. Direct formatting corresponds to the formatting attributes of the cut or copied content to be cut or copied that are associated with emphasizing some or all of the cut or copied content. FIGS. 8a-8c and 9a-9c, discussed below, illustrate examples of local and direct formatting.

Referring to FIGS. 2 and 3, at step 310, a user selects content from an electronic document 220 and initiates a cut/copy/paste operation on the content by either actuating a button on a toolbar or selecting an item in a menu, such as with a pointing device 265 or keyboard 260.

At step 320, the copy module 210 receives the indication to cut or copy the selected content. At step 330, the formatting module 215 determines local and direct formatting for all format types for a region that includes the location of the selected content, the source location region. This step is discussed in greater detail below in conjunction with FIG. 4.

At step 340, the user places the insertion point at a location that will receive the cut or copied content and initiates a paste command. This location may be within the same electronic document 220 from which it was cut or copied or a different electronic document. At step 350, the formatting module 215 determines the local formatting for all format types at the destination location region, that is, the location around the insertion point. This step is discussed in greater detail below in conjunction with FIG. 5.

In this exemplary embodiment, the source location region may include a greater amount of content in the electronic document 220 than simply the cut or copied selected content. In this way, the local and direct formatting determined at step 330 is not based only on the formatting attributes of the selected content. In other words, the selected content is a subset of the source location region used to determine local and direct formatting of the source location region. Similarly, a destination location region includes a greater amount of content than the insertion point. As such, the local formatting for the destination location region determined at step 350 is not based only on the formatting attributes just before or just after the insertion point. In other words, the insertion point location is a subset of the destination location region used to determine the local formatting associated with the destination location region.

At step 360, the formatting module 215 compares local formatting between the source location region, as determined at step 330, and the destination location region, as determined at step 350. For example, the local formatting at the source location may have a font face of Arial, a font size of 10 point, and a color of black. The destination location may have a font face of Times New Roman, a font size of 10 point and a color of black and be italicized. At step 360, the formatting module 215 compares the format attributes involved, in this example font face, font size, color, and italics, for the source location and destination location for each of these format attributes and record, on a dynamic style sheet, the differences between the sets of local formatting attributes.

At step 370, the formatting module 215 applies the differences between the local formatting at the destination location and the source location to the pasted text. This step is discussed in greater detail below in conjunction with FIG. 6. At step 380, which is discussed in greater detail below in conjunction with FIG. 7, the formatting module 215 applies direct formatting to the pasted content.

At step 390, the copy module 210 pastes the content at the destination location such that the content is formatted as applied to the content in steps 370 and 380. At step 399, the process 300 ends.

Figure 4:
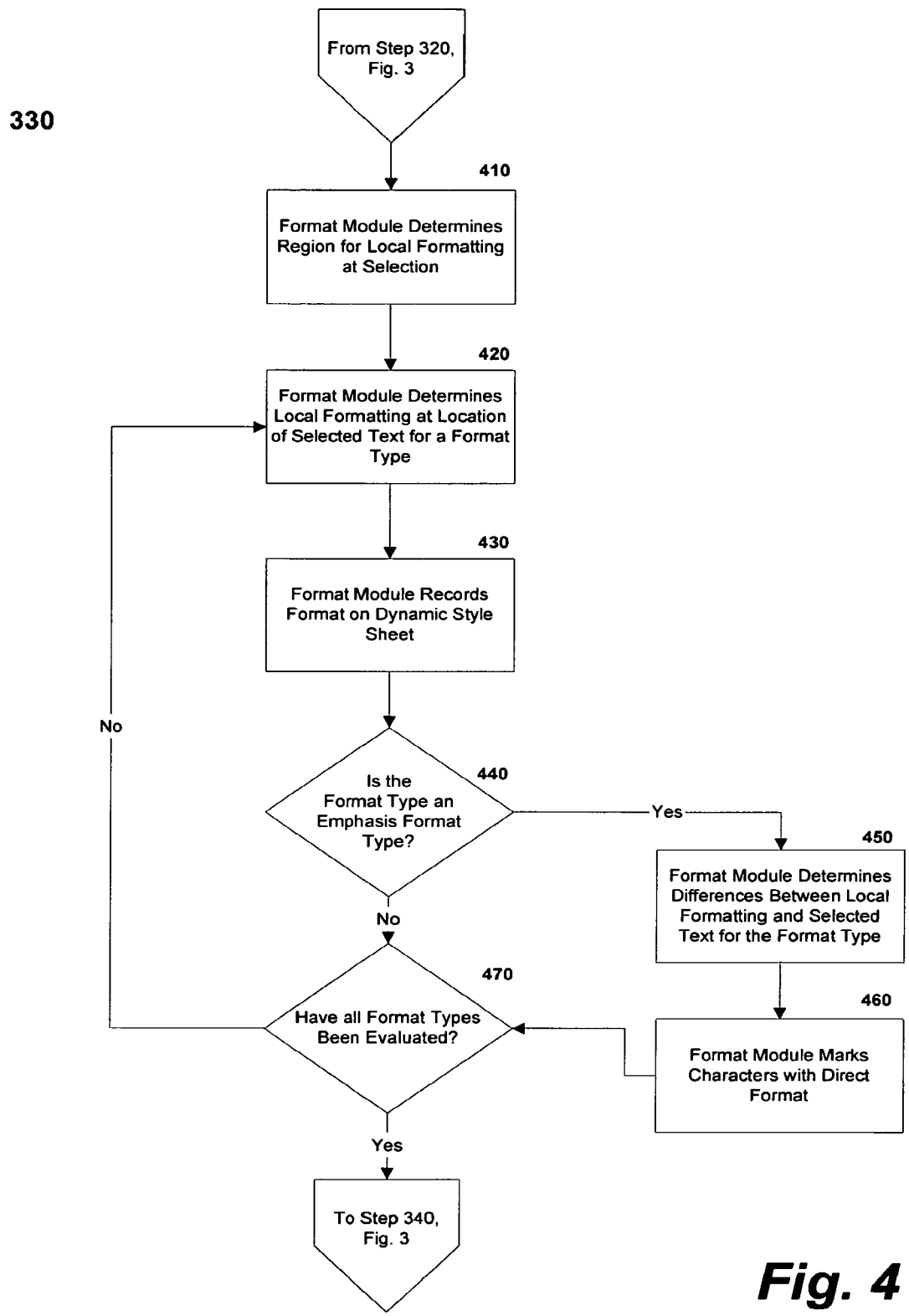
FIG. 4 is a flow diagram presenting a process for determining format attributes associated with a region containing selected content to be cut or copied in an electronic document in accordance with an exemplary embodiment of the present invention.

FIG. 4 is a flow diagram presenting a process 330 for determining format attributes associated with a region containing selected content to be cut or copied in an electronic document 220 in accordance with an exemplary embodiment of the present invention. Referring to FIGS. 2, 3, and 4, at step 410, the formatting module 215 determines the region for evaluating the local formatting of the content selected at step 310. This region may be the paragraph that contains the selected content or may include multiple paragraphs in either direction of the selected content. Generally, the source location region will include a greater amount of content that the cut or copied content. If the selected content is within an outline object, the region could be that outline object or all of the outline objects within a certain distance of the outline object containing the selected content. The document editing module 205 may define the distance that is evaluated when determining the region at step 410 or a user may define the region, such as by selecting an option in a menu.

Alternatively, the region may be defined by the level that the selected content is at in an outline object. Outline objects may have multiple levels of content, with each level indicated by how the content is indented relative to a fixed edge of the outline object. For example, for outline objects containing English text, the indented content may be relative to a left edge of the outline object. For languages that read right-to-left, the indented content may be indented relative to a right edge of an outline object. In these cases, the region determined at step 410 may be all of the content at a given level in one or more outline objects. FIG. 9a, discussed below, illustrates outline object levels.

One skilled in the art would appreciate that this region could be a variety of different sizes. One skilled in the would also appreciate that the larger the region, the slower the copy and paste operation may be performed by the central processing unit 120 (FIG. 1).

At step 420, the formatting module 215 determines the local formatting for a specific format type, such as font face within the source location region. The local formatting is the formatting attribute that is characterized by more than fifty percent of the content in the region determined at step 410. For example, if sixty percent of the content in the region is type face Times New Roman, twenty percent of the content in the region is Arial, and twenty percent of the content in the region is Courier, then the local formatting for the type face attribute is Times New Roman. If the format type in the region is not characterized by more than fifty percent of a single attribute, then the format type is mixed. For example, the type face format type would be mixed if the region has forty percent Times New Roman, thirty percent Arial, and thirty percent Courier. One skilled in the art would appreciate that alternative rules may be developed, such as assigning the format type the attribute with the largest percentage within a determined region.

At step 430, the formatting module 215 records the format for the region for that format type on a dynamic style sheet. For example, if the font face format type for the region was more than fifty percent Times New Roman, then "Times New Roman" would be recorded on the dynamic style sheet for the font face format type. If the region has a mixed font face, then "mixed" would be indicated on the dynamic style sheet.

At step 440, the process 330 determines if the format type under consideration is an emphasis format type. Emphasis format types include font size, bold, italics, underline, and color. One skilled in the art would appreciate that a different set of format types may be designated as emphasis format types. If the result at step 440 is "No," then the process 330 moves to step 470.

A user may apply emphasis formatting to make some content in an electronic document 220 stand out when viewed on a GUI displaying the electronic document 220 or a printed document version of the electronic document 220 as compared to the content surrounding the emphasized content. Certain format types are typically used to provide emphasis for content. For example, if a user wants to emphasize a word in a sentence, and the content that makes up the sentence has format attributes that include no bolding and no italics, the user may apply the bolding or italics format attribute to the word to emphasize that word relative to the rest of the sentence. FIGS. 8a-8c and 9a-9c, discussed below, illustrate examples of emphasis formatting.

If the format type is an emphasis format, that is, the result at step 440 is "Yes," the process 330 moves to step 450 and the format module 215 determines the differences between the local formatting determined at step 420 and recorded at step 430 and the formatting of the content selected at step 310 for that format type. For example, if the format type being evaluated is bold and the local format is unbolded content, the selected text is evaluated for content that is bolded. In this step, the format module 215 determines which characters, if any, in the cut or copied content are being emphasized. That is, which characters have format characteristics that differ from the local formatting at the source selection location and may be indicative of a user applying that format to emphasize the characters in the content.

At step 460, the format module 215 marks the content with direct formatting. For example, if the format type being evaluated is bold and the local format is unbolded content and the selected content contains one or more bolded characters, then the format module 215 marks the characters as having direct, or emphasis, formatting consisting of bolding. This marking step is accomplished by recording on a dynamic style sheet that the characters have direct formatting.

At step 470, the process 330 determines if all format types have been evaluated. If the result at step 470 is "No," the process 330 returns to step 420 to evaluate the next format type. A list of format types may include font face, font size, bold, italics, underline, strikethrough, color, line spacing, and indent characteristics. If the result at step 470 is "Yes," the process moves to step 340 in process 300.

Figure 5:
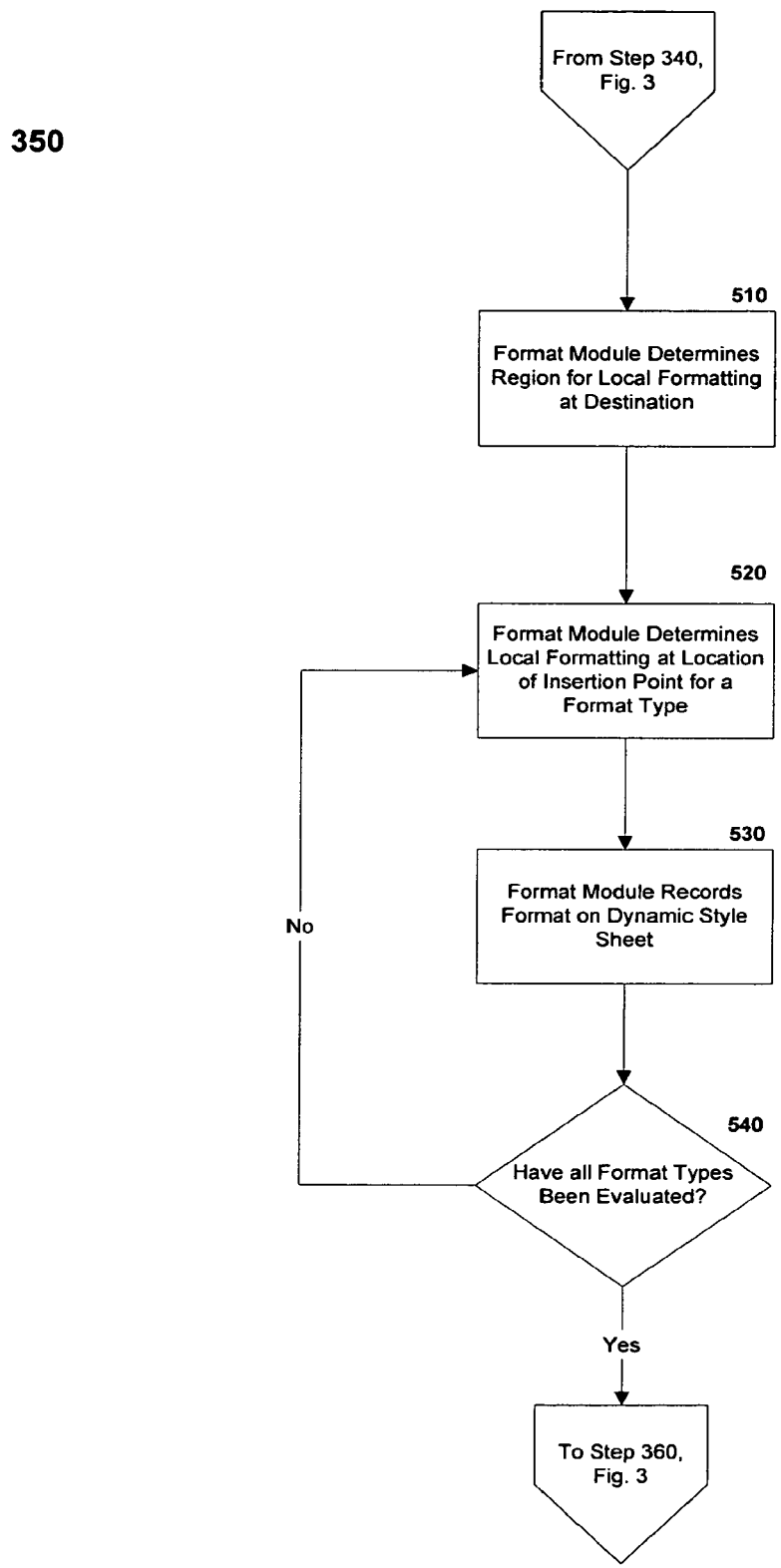
FIG. 5 is a flow diagram presenting a process for determining format attributes associated with a region containing a location to which cut or copied content is to be pasted in an electronic document in accordance with an exemplary embodiment of the present invention.

FIG. 5 is a flow diagram presenting a process 350 for determining format attributes associated with a region containing a location to which cut or copied content is to be pasted in an electronic document 220 in accordance with an exemplary embodiment of the present invention. Referring to FIGS. 2, 3, and 5, at step 510, the formatting module 215 determines the region for evaluating the local formatting of the destination of the pasted content. This region may be the paragraph that contains the insertion point, which indicates the destination location where the content will be pasted, or added, or may include multiple paragraphs in either direction of the insertion point. If the insertion point is within an outline object, the region could be that outline object or all of the outline objects within a certain distance of the outline object containing the insertion point. The document editing module 205 may define the distance that is evaluated when determining the region at step 510 or a user may define the region, such as by selecting an option in a menu.

Alternatively, the region may be defined by the level that the insertion point is at in an outline object. Outline objects may have multiple levels of content, with each level indicated by how the content is indented relative to a fixed edge of the outline object. For example, for outline objects containing English text, the indented content may be relative to a left edge of the outline object. For languages that read right-to-left, the indented content may be indented relative to a right edge of an outline object. In these cases, the region determined at step 510 may be all of the content at a given level in one or more outline objects.

At step 520, the formatting module 215 determines the local formatting for a specific format type, such as font face in the destination location region. The local formatting is the formatting attribute that is characterized by more than fifty percent of the content in the region determined at step 510. If the format type in the region does not have more than fifty percent a single attribute, then the format type is mixed. One skilled in the art would appreciate that alternative rules may be developed, such as assigning the format type the attribute with the largest percentage within a determined region. In this exemplary embodiment, the rule at step 520 is the same as the rule at step 420, but one skilled in the art will appreciate that the two rules could be different.

At step 530, the formatting module 215 records the format for the region for that format type on a dynamic style sheet. For example, if the font face format type for the region was more than fifty percent Times New Roman, then Times New Roman would be recorded on the dynamic style sheet for the format type font face. If the region has a mixed font face, then mixed would be indicated on the dynamic style sheet.

At step 540, the process 350 determines if all format types have been evaluated. If the result at step 540 is "No," the process 350 returns to step 520 to evaluate the next format type. A list of format types may include font face, font size, bold, italics, underline, strikethrough, color, line spacing, and indent characteristics. If the result at step 540 is "Yes," the process moves to step 360 in process 300.

Figure 6:
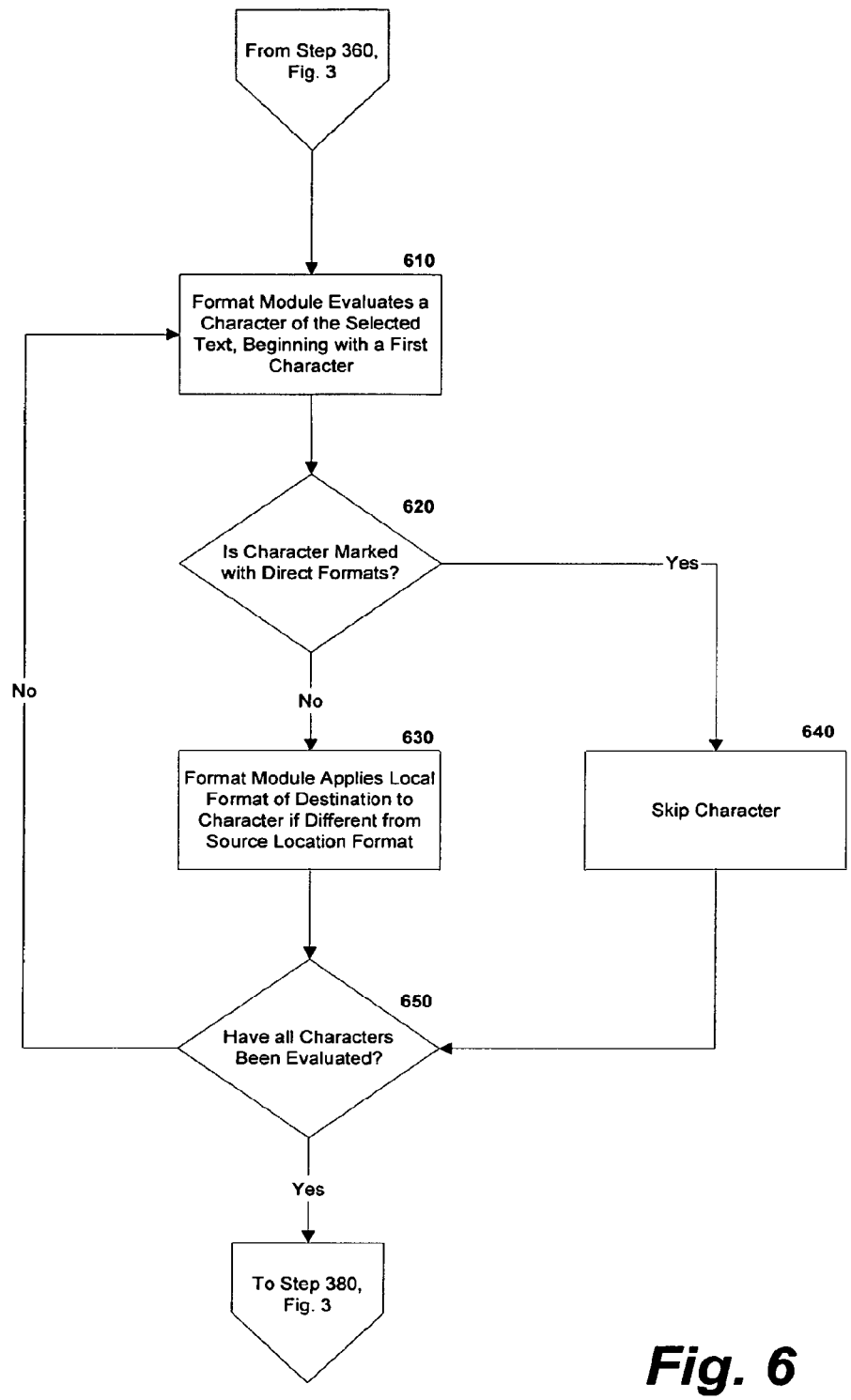
FIG. 6 is a flow diagram presenting a process for applying local formatting to pasted content in accordance with an exemplary embodiment of the present invention.

FIG. 6 is a flow diagram presenting a process 370 for applying local formatting to pasted content in accordance with an exemplary embodiment of the present invention. Referring to FIGS. 2, 3, and 6, at step 610 the format module 215 evaluates a character of the selected content, beginning with the first character of the content. At step 620, the format module 215 determines if the character evaluated at step 610 is marked with direct formats. If the result at step 620 is "Yes," then the process 370 moves to step 640, where the character being evaluated is skipped and the process 370 moves to step 650.

If the result at step 620 is "No," then, at step 630, the format module 215 applies the local format of the destination region to the character if the destination local formatting is different from the source location local formatting, as determined at steps 330, 350, and 360. If the formatting for a specific format type is mixed at the destination location, then no formatting is applied to the character at step 630. In other words, the character retains the formatting it had when it was selected and cut or copied.

At step 650, the format module 215 determines if all of the characters in the cut or copied content have been evaluated. If the result at step 650 is "No," then the process 370 returns to step 610 and the next character in the content is evaluated. If the result at step 650 is "Yes," then the process 370 moves to step 380 in process 300. The process 370 has been described as starting with the first character of the copied or cut content and evaluating each character in succession. One skilled in the art would appreciate that the evaluation can be performed in any order, as long as the entire content is evaluated.

Figure 7:
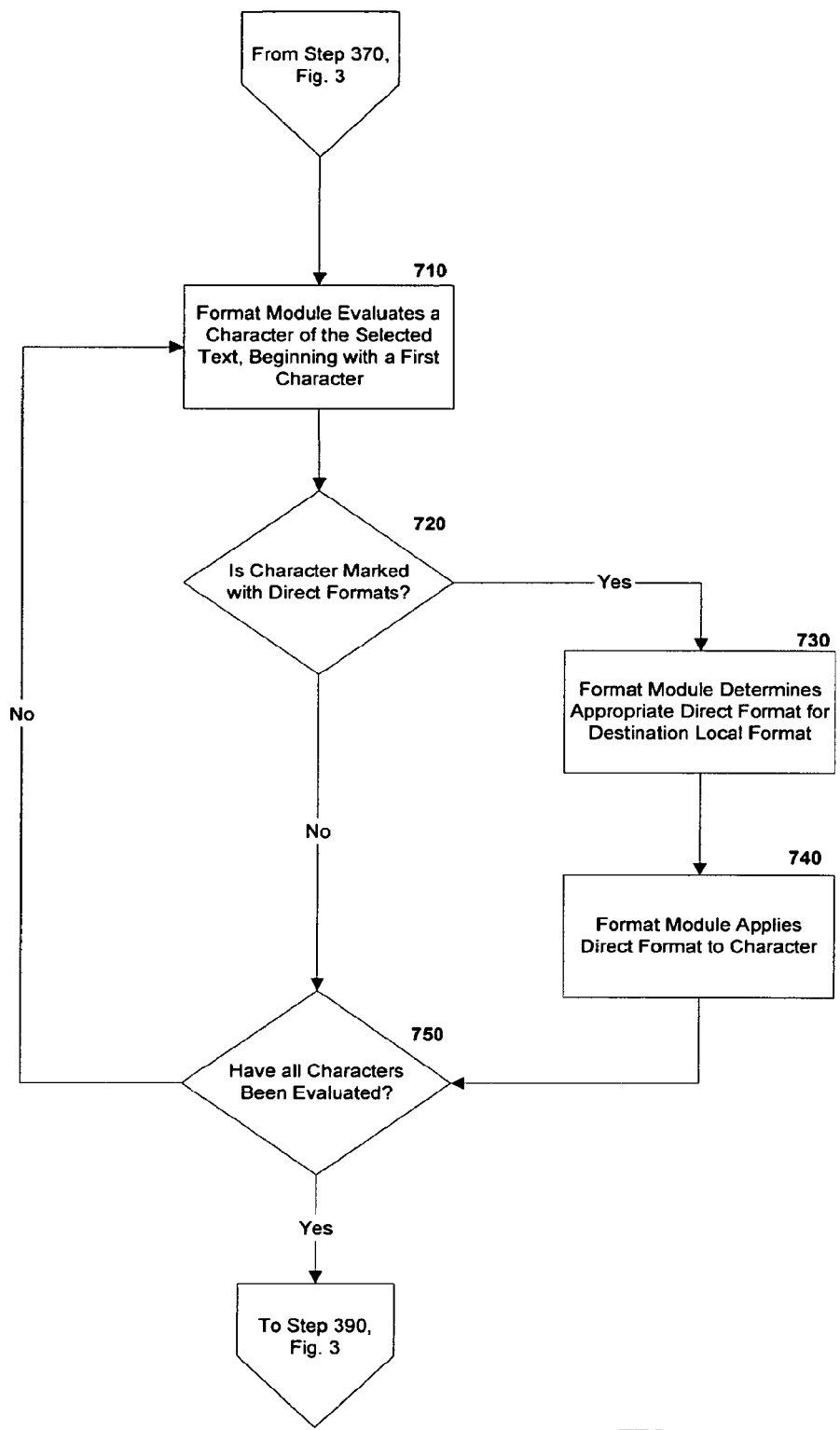
FIG. 7 is a flow diagram presenting a process for applying direct formatting to pasted content in accordance with an exemplary embodiment of the present invention.

FIG. 7 is a flow diagram presenting a process 380 for applying direct formatting to pasted content in accordance with an exemplary embodiment of the present invention. FIGS. 2, 3, and 7, at step 710 the format module 215 evaluates a character of the selected content, beginning with the first character of the content. At step 720, the format module 215 determines if the character evaluated at step 710 is marked with direct formats. If the result at step 720 is "Yes," then the process 380 moves to step 730. Otherwise, the process 380 moves to step 750.

At step 730, the format module 215 determines the appropriate direct formatting for the character. Direct formatting is applied to characters marked with direct formatting at step 330. These characters are marked with direct formatting to indicate that the format module 215 determined that these characters were being emphasized.

For example, at the source location, the local formatting may be Arial font face and not italicized, at the destination location the local formatting may be Times New Roman font face and italicized, and the cut or copied content may include a word that is italicized. Since the local formatting at the source was non-italics, then, at step 330, the italicized word in the cut or copied content would have been marked for direct formatting. Since the destination formatting includes italics, then, at step 730, the format module 215 would determine that the appropriate direct formatting is non-italics. The reason for this determination is that the format module 215 determines that the italicized word in the cut or copied content was italicized for emphasis, as compared to the non-italicized words that make up the majority of the content in the source location region. Since the majority of the content at the destination location region in this example contains italicized content, then the format module 215 determines that a non-italicized word would be emphasized at the destination location. This process is illustrated below, in conjunction with FIGS. 8a-8c and FIGS. 9a-9c.

Similar to the italics example presented above, at step 730, the format module 215 may determine what format characteristic constitutes emphasized content for format types such as bold, font size, color, and underlining. For example, if certain characters in the cut or copied content are larger than the source local formatting, then, at step 730, the format module 215 will determine what size to make those characters given the local formatting at the destination location.

For those format attributes that the format module determines does not contribute to the direct formatting, the format module 215 applies the local formatting of the destination region, if different from the local format of the source region.

At step 740, the format module 215 applies the direct formatting to the character, as determined in step 730. At step 750, the format module 215 determines whether all characters have been evaluated. If the result at step 750 is "No,' then the process 380 returns to step 710. If the result at step 750 is "Yes,' the process 380 moves to step 390 in process 300. The process 380 has been described as starting with the first character of the copied or cut content and evaluating each character in succession. One skilled in the art would appreciate that the evaluation can be performed in any order, as long as the entire content is evaluated.

Processes 370 and 380 have been presented as occurring in series. One skilled in the art would appreciate that they could be accomplished in parallel, with the local and direct formatting being applied, as appropriate, to a character before the next character is evaluated.

FIGS. 8a-8c and 9a-9c illustrate display images that depict the progression of steps for process 300 (FIG. 3). FIG. 8a is a display image 800 depicting two regions of text such as a source region 810 and a destination region 850 within an electronic document 220 in accordance with an exemplary embodiment of the present invention. Referring to FIG. 8a, the source region 810 includes a paragraph of text. The text includes a word 820, "black." The word 820 has formatting attributes that include being bolded and italicized. The source region 810 also includes a word 830, "italic," and a word 840, "bold," which have formatting attributes that include being underlined.

The destination region 850 includes text, such as word 860, which has the formatting attribute of being italicized. The destination region 850 also includes a phrase 870, "18 point," which has the formatting attribute of being underlined and a word 880, "italicized," which has the format attribute of not being italicized.

FIG. 8b is a display image 900 depicting text selected to be cut or copied from a source region 810 in accordance with an exemplary embodiment of the present invention. Referring to FIGS. 2, 3, and 8b, a portion 910 of the content of the source region 810 has been selected, such as by a pointing device 265, in accordance with step 310 of the exemplary process 300. In the example of FIG. 8b, the user initiates a copy operation, by actuating a button on a toolbar or selecting an entry in a menu. In response to this operation, the format module 215 determines, at step 330 of process 300, the local and direct formatting associated with the selected text 910.

In this example, one hundred percent of the content in region 810, the source region, has font face Arial, font size 18 point, and color black. Greater then fifty percent of the content in source region 810 is not italicized, not bolded, and not underlined. This characterization is the local formatting for the source region 810. The direct formatting of the selected text 910 is associated with the characters in the word 820. These characters are bolded and italicized. Since the local formatting in the source region 810 is not italicized and not bolded, the format module 215 identifies the characters in the word 820 as emphasized, that is, they have direct formatting.

Once the user has performed the copy operation on the selected text 910, the insertion point 920 is placed at a location that will receive the copied text 910. In this example, the insertion point 920 is placed in the destination region 850. The user would then initiate a paste command, such as by actuating a button on a toolbar or selecting an item in a menu.

In accordance with our exemplary process 300, in response to the paste command, the format module 215 determines the local format for the destination region 850. In this example, one hundred percent of the content of the destination region 850 is font face Times New Roman, font size 18 point, and color black. Greater than fifty percent of the content of the destination region 850 is italicized, not bolded, and not underlined. As such, the local formatting for the destination region 850 is font face Times New Roman, font size 18, black color, italicized, not bolded, and not underlined.

When the local formats for the source region 810 and destination region 850 are compared, as is done at step 360 of the exemplary process 300, the differences between the source region 810 and destination region 850 include the font face and italics.

FIG. 8c is a display image 1000 depicting text pasted into a destination region 850 in accordance with an exemplary embodiment of the present invention. Referring to FIGS. 2, 3, and 8c, in the display image 1000, a sentence 1010, which corresponds to the selected text 910 (FIG. 8b), has been inserted into the destination region 850 at the insertion point 920 (FIG. 8b).

In accordance with the exemplary process 300, the format module 215 applied the format attributes of the destination that were different then the format attributes of the source to the pasted sentence 1010. The font face of Times New Roman, the font face format attribute of the destination region 850, was applied to the characters of the sentence 1010 that were not marked with direct formatting, since the font face attribute of the destination region 850 was different from the font face attribute of the source region 810. Similarly, the italics format attribute was applied to the characters of the sentence that were not marked with direct formatting.

The characters of the word 1020 were marked with direct formatting. In this example, the format module 215 determined that the emphasis of the selected word 820 (FIG. 8a), which was bold and italicized when in the source region 810, should be bold and not italicized. As can be seen in display image 1000, the word 1020 is emphasized compared to the surrounding words in sentence 1010 and the rest of the content in the destination region 850. Also, the format module 215 applied the font face of Times New Roman, since the format module 215 determined that this attribute was not associated with the emphasis of the word 1010 and this attribute was different in the destination region 850 as compared to the source region 810.

FIG. 9a is a display image 1100 depicting two regions of text within outline objects such as a source region 1110 and a destination region 1170 in accordance with an exemplary embodiment of the present invention. Referring to FIG. 9a, the source region 1110 and destination region 1170 represent outline objects within an electronic document 220. The source region outline object 1110 and destination region outline object 1170 have content at multiple levels, with each level define by an indentation distance from a margin, in this example, the left margin of the outline objects 1110, 1170. For example, content 1120 is at a first level, defined as level A in this example. The example of display image 1100 has parenthetical expressions including the level designation, such as expression 1130. Similarly, content 1140 and content 1150 represent content at level B and level C, respectively. The destination region outline object 1170 is similarly formatted, with a prime symbol (') used in conjunction with a letter expression to designate the outline level 1160.

As with any content in an electronic document 220, an outline object may have distinct formatting characteristics, as seen with content 1180, where most of the text is colored grey while the balance of the destination region outline object 1170 has text characters with the font color attribute of black.

FIG. 9b is a display image 1200 depicting text selected to be cut or copied from a source region outline object 1110 in accordance with an exemplary embodiment of the present invention. Referring to FIGS. 2, 3, and 9b, a portion 1210 of the content of the source region outline object 1110 has been selected, such as by a pointing device 265, in accordance with step 310 of the exemplary process 300. In the example of FIG. 9b, the user initiates a copy operation, by actuating a button on a toolbar or selecting an entry in a menu. In response to this operation, the format module 215 determines, at step 330 of process 300, the local and direct formatting associated with the selected text portion 1210.

Since the source region outline object 1110 is an outline object, the exemplary process 300 determines local formatting based on content at the same level within the source region as the selected content. In this example, one hundred percent of the content in the source region outline object 1110, the source region, has font face Arial, font size 14 point, color black, not italicized and is not bolded. Greater then fifty percent of the content in the source region outline object 1110 is not underlined. This characterization is the local formatting for the source region outline object 1110. The direct formatting of the selected text portion 1210 is associated with the characters in the selected text portion 1210. Some of these characters are underlined. Since the local formatting in the source region outline object 1110 is not underlined, the format module 215 identifies the characters in the portion 1210 that are underlined as emphasized, that is, they have direct formatting.

Once the user has performed the copy operation on the selected text portion 1210, the insertion point 1220 is placed at a location that will receive the copied text portion 1210. In this example, the insertion point 1220 is placed in the destination region outline object 1170. The user would then initiate a paste command, such as by actuating a button on a toolbar or selecting an item in a menu.

In accordance with our exemplary process 300, in response to the paste command, the format module 215 determines the local format for the destination region outline object 1170. Since the destination region outline object 1170 is an outline object, the exemplary process 300 determines local formatting based on content at the same level within one or more outline objects within a destination region. One skilled in the art would appreciate that an alternative rule, such as using the characteristics of all of the levels within outline objects within a source or destination region when determining the local formatting for that region.

In this example, one hundred percent of the content of the destination region 850 is font face Arial, font size 14 point, and not italicized, and not bolded. Greater than fifty percent of the content of the destination region outline object 1170 is font color grey and not underlined. As such, the local formatting for the destination region 850 is font face Arial, font size 14, grey color, not italicized, not bolded, and not underlined.

When the local formats for the source region outline object 1110 and the destination region outline object 1170 are compared, as is done at step 360 of the exemplary process 300, the differences between the source region outline object 1110 and the destination region outline object 1170 include the font color.

FIG. 9c is a display image 1300 depicting text pasted into a destination region outline object 1170 in accordance with an exemplary embodiment of the present invention. Referring to FIGS. 2, 3, and 9c, in the display image 1300, content 1320, which corresponds to the selected text 1210 (FIG. 9b), has been inserted into the destination region outline object 1170 at the insertion point 1220 (FIG. 9b).

In accordance with the exemplary process 300, the format module 215 applied the format attributes of the destination that were different then the format attributes of the source to the selected text portion 1210. The font color of grey was applied to the characters of the selected 1210 that were not marked with direct formatting, since the font color attribute of level C' of the destination region outline object 1170 was different from the font color attribute of level B of the source region outline object 1110.

Some of the characters of the content 1320 were marked with direct formatting (the characters that make up the word "Arial"). In this example, the format module 215 determined that the emphasis of the characters that make up the word "Arial" in the selected text portion 1210 (FIG. 9b), which is underlined in the source region outline object 1110, should be underlined when pasted into the destination region outline object 1170. As can be seen in display image 1300, the characters making up the word "Arial" in the pasted content 1320 are emphasized compared to the surrounding content 1180. Also, the format module 215 applied the font color of grey, since the format module 215 determined that this attribute was not associated with the emphasis of the characters of the word "Arial" in the selected portion of text 1210 (FIG. 9b) and this attribute was different in the destination region outline object 1170 as compared to the source region outline object 1110.

One skilled in the art would appreciate that the present invention supports a method for determining and applying format attributes associated with content in an electronic document that is cut or copied from an electronic document and pasted into the same or different electronic document. The determination may be based on the format attributes of the content within a region of an electronic document containing the cut or copied content and the format attributes of a region of content that includes the location where the cut or copied text may be pasted. The method may determine and apply local formatting that may be associated with the source region of content and the destination region of content and direct, or emphasis formatting, that may be associated with content that has been cut or copied.

What is claimed is:

1. A computer-implemented method comprising:
receiving a selection of content in a source region within an electronic document;
determining, by one or more computing devices, a local formatting of the source region within the electronic document;
determining whether a portion of the selected content has a direct formatting for emphasis relative to the local formatting in the source region;
receiving a selection to paste the selected content at an insertion point in a destination region;
determining a local formatting of the destination region within the electronic document;
formatting the selected content with the local formatting of the destination region;
determining whether application of the direct formatting to the portion of the selected content will maintain emphasis relative to the local formatting of the destination region;
if the application of the direct formatting to the portion of the selected content will maintain emphasis, applying the direct formatting to the portion of the selected content; and
if the application of the direct formatting to the portion of the selected content will not maintain emphasis, applying a second direct formatting to the portion of the selected content for emphasis relative to the local formatting of the destination region.

2. The computer-implemented method of claim 1, further comprising: recording the local formatting of the source region as a dynamic style sheet.

3. The computer-implemented method of claim 1,
wherein the source region comprises a paragraph that contains the selected content; and
wherein the destination region comprises a paragraph that contains the insertion point.

4. The computer-implemented method of claim 1, wherein the selected content is to be either copied or cut.

5. The computer-implemented method of claim 1, wherein the source region includes outline objects within a certain distance of an outline object containing the selected content.

6. The computer-implemented method of claim 1,
wherein the local formatting for the source region comprises a plurality of format attributes associated with different format types; and
wherein a format attribute is generally applicable within the source region when the format attribute characterizes more than fifty percent of content in the source region.

7. The computer-implemented method of claim 1,
wherein the local formatting for the source region comprises a plurality of format attributes associated with different format types; and wherein a format attribute associated with a given format type is generally applicable within the source region when the format attribute characterizes a greater percentage of text characters in the source region than any other format attribute associated with the given format type.

8. A computing device comprising:
a processing unit; and
a system memory that stores computer-executable instructions that, when executed by the processing unit, cause the computing device to:
determine a local formatting of a source region within an electronic document;
determine whether a portion of the selected content has a direct formatting for emphasis relative to the local formatting in the source region;
receive a selection to paste the selected content at an insertion point in a destination region;
determine a local formatting of the destination region within the electronic document;
format the selected content with the local formatting of the destination region;
determine whether application of the direct formatting to the portion of the selected content will maintain emphasis relative to the local formatting of the destination region;
if the application of the direct formatting to the portion of the selected content will maintain emphasis, apply the direct formatting to the portion of the selected content; and
if the application of the direct formatting to the portion of the selected content will not maintain emphasis, apply a second direct formatting to the portion of the selected content for emphasis relative to the local formatting of the destination region.

9. The computing device of claim 8, wherein the computer-executable instructions, when executed by the processing unit, cause the computing device to record the local formatting of the source region as a dynamic style sheet.

10. The computing device of claim 8,
wherein the source region comprises multiple paragraphs in either direction of the selected content; and
wherein the destination region comprises multiple paragraphs in either direction of the insertion point.

11. The computing device of claim 8, wherein the source region includes outline objects within a certain distance of an outline object containing the selected content.

12. The computing device of claim 8,
wherein the local formatting for the source region comprises a plurality of format attributes associated with different format types; and
wherein a format attribute is generally applicable within the source region when the format attribute characterizes more than fifty percent of content in the source region.

13. The computing device of claim 8, wherein the selected content is to be either copied or cut.

14. A computer-readable storage device that stores computer-executable instructions that, when executed by a processing unit of a computing device, cause the computing device to:
receive a selection of content in a source region within an electronic document;
determine a local formatting of the source region within the electronic document;
determine whether a portion of the selected content has a direct formatting for emphasis relative to the local formatting in the source region;
receive a selection to paste the selected content at an insertion point in a destination region;
determine a local formatting of the destination region within the electronic document;
format the selected content with the local formatting of the destination region;
determine whether application of the direct formatting to the portion of the selected content will maintain emphasis relative to the local formatting of the destination region;
if the application of the direct formatting to the portion of the selected content will maintain emphasis, apply the direct formatting to the portion of the selected content; and
if the application of the direct formatting to the portion of the selected content will not maintain emphasis, apply a second direct formatting to the portion of the selected content for emphasis relative to the local formatting of the destination region.

15. The computer-readable storage device of claim 14, further comprising: recording the local formatting of the source region as a dynamic style sheet.

16. The computer-readable storage device of claim 14,
wherein the source region comprises a paragraph that contains the selected content; and
wherein the destination region comprises a paragraph that contains the insertion point.

17. The computer-readable storage device of claim 14, wherein the selected content is to be either copied or cut.

18. The computer-readable storage device of claim 14, wherein the source region includes outline objects within a certain distance of an outline object containing the selected content.

19. The computer-readable storage device of claim 14,
wherein the local formatting for the source region comprises a plurality of format attributes associated with different format types; and
wherein a format attribute is generally applicable within the source region when the format attribute characterizes more than fifty percent of content in the source region.

20. The computer-readable storage device of claim 14,
wherein the local formatting for the source region comprises a plurality of format attributes associated with different format types; and
wherein a format attribute associated with a given format type is generally applicable within the source region when the format attribute characterizes a greater percentage of text characters in the source region than any other format attribute associated with the given format type.

* * * * *